(12) United States Patent
Kim et al.

(10) Patent No.: US 6,937,559 B1
(45) Date of Patent: Aug. 30, 2005

(54) APPARATUS AND METHOD FOR ALLOCATING WALSH CODES IN CDMA COMMUNICATION SYSTEM HAVING VARIABLE RATE CHANNEL STRUCTURE

(75) Inventors: Jae-Yoel Kim, Kunpo-shi (KR); Hee-Won Kang, Seoul (KR); Jae-Min Ahn, Kangnam-gu (KR); Seung-Joo Maeng, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/503,258

(22) Filed: Feb. 14, 2000

(30) Foreign Application Priority Data

Feb. 13, 1999 (KR) ................................. 1999-5269

(51) Int. Cl.[7] .............................................. H04J 11/00
(52) U.S. Cl. ..................................... 370/209; 370/310
(58) Field of Search ................................ 370/310, 328, 370/329, 330, 335, 342, 431, 437, 441, 464, 370/465, 479, 208, 209

(56) References Cited

U.S. PATENT DOCUMENTS

| | | | | |
|---|---|---|---|---|
| 5,751,761 A | * | 5/1998 | Gilhousen | 375/146 |
| 6,163,524 A | * | 12/2000 | Magnusson et al. | 370/208 |
| 6,314,107 B1 | * | 11/2001 | Shanbhag | 370/441 |
| 6,317,413 B1 | * | 11/2001 | Honkasalo | 370/209 |
| 6,335,922 B1 | * | 1/2002 | Tiedemann et al. | 370/335 |
| 6,418,148 B1 | * | 7/2002 | Kumar et al. | 370/468 |
| 6,526,065 B1 | * | 2/2003 | Cheng | 370/441 |

FOREIGN PATENT DOCUMENTS

JP     10-190520     7/1998

(Continued)

OTHER PUBLICATIONS

Japanese Office Action dated Jan. 6, 2004 issued in a counterpart application, namely, Appln. No. 2000-599147.

*Primary Examiner*—Huy D. Vu
*Assistant Examiner*—Daniel Ryman
(74) *Attorney, Agent, or Firm*—Dilworth & Barrese LLP (57) ABSTRACT

A channel spreading device for a CDMA communication system is disclosed. The channel spreading device includes; a storage medium for storing orthogonal code numbers which cannot maintain an orthogonality when an orthogonal code for a maximum data rate is used; a controller for determining whether the respective orthogonal code numbers stored in the storage medium are available at a given data rate, when at least one data user requests data transmission at the given data rate, and outputting the determined available orthogonal code numbers and control signals according to the determination result; a plurality of channel transmitters, provided in association with the orthogonal code numbers from the controller, for spreading data from the data user with an orthogonal code corresponding to the orthogonal code number from the controller; and a plurality of multipliers for multiplying outputs of the channel transmitters by control signals from the controller, a plurality of channel transmission circuits; a storage medium for storing orthogonal code numbers which cannot maintain an orthogonality when an orthogonal code for a maximum data rate is used; a controller for determining whether the respective orthogonal code numbers stored in the storage medium are available at a given data rate, when at least one data user requests data transmission at the given data rate, and outputting the determined available orthogonal code numbers and control signals according to the determination result.

29 Claims, 8 Drawing Sheets

FOREIGN PATENT DOCUMENTS

| | | |
|---|---|---|
| JP | 10-290211 | 10/1998 |
| JP | 2000-232432 | 8/2000 |
| WO | WO 98/52307 | 11/1998 |
| WO | WO 99/03224 | 1/1999 |

* cited by examiner

| | SYMBOL #1 | SYMBOL #2 | SYMBOL #3 | SYMBOL #4 |
|---|---|---|---|---|
| USER #1<br>DATA RATE: 38.4kbps<br>WALSH LENGTH: 64<br>WALSH CODE: W8 | 8TH WALSH CODE (W"8) | 8TH WALSH CODE (W"8) | 8TH WALSH CODE (W"8) | 8TH WALSH CODE (W"8) |
| USER #2<br>DATA RATE: 19.2kbps<br>WALSH LENGTH: 128<br>WALSH CODE: W8 | SYMBOL #1 8TH WALSH CODE (W"8) | 8TH WALSH CODE ($\overline{W"8}$) | SYMBOL #2 8TH WALSH CODE (W"8) | 8TH WALSH CODE ($\overline{W"8}$) |
| USER #3<br>DATA RATE: 9.2kbps<br>WALSH LENGTH: 128<br>WALSH CODE: W72 | SYMBOL #1 8TH WALSH CODE (W"8) | 8TH WALSH CODE ($\overline{W"8}$) | SYMBOL #2 8TH WALSH CODE (W"8) | 8TH WALSH CODE ($\overline{W"8}$) |
| USER #4<br>DATA RATE: 9.6kbps<br>WALSH LENGTH: 256<br>WALSH CODE: W8 | SYMBOL #1 8TH WALSH CODE (W"8) | 8TH WALSH CODE ($\overline{W"8}$) | 8TH WALSH CODE (W"8) | 8TH WALSH CODE ($\overline{W"8}$) |
| USER #5<br>DATA RATE: 9.6kbps<br>WALSH LENGTH: 256<br>WALSH CODE: W72 | SYMBOL #1 8TH WALSH CODE (W"8) | 8TH WALSH CODE ($\overline{W"8}$) | 8TH WALSH CODE (W"8) | 8TH WALSH CODE ($\overline{W"8}$) |
| USER #6<br>DATA RATE: 9.6kbps<br>WALSH LENGTH: 256<br>WALSH CODE: W136 | SYMBOL #1 8TH WALSH CODE (W"8) | 8TH WALSH CODE ($\overline{W"8}$) | 8TH WALSH CODE (W"8) | 8TH WALSH CODE ($\overline{W"8}$) |
| USER #7<br>DATA RATE: 9.6kbps<br>WALSH LENGTH: 256<br>WALSH CODE: W200 | SYMBOL #1 8TH WALSH CODE (W"8) | 8TH WALSH CODE ($\overline{W"8}$) | 8TH WALSH CODE (W"8) | 8TH WALSH CODE ($\overline{W"8}$) |

APPARATUS AND METHOD FOR ALLOCATING WALSH CODES IN CDMA COMMUNICATION SYSTEM HAVING VARIABLE RATE CHANNEL STRUCTURE

PRIORITY

This application claims priority to an application entitled "Apparatus and Method for Allocating Walsh Codes in CDMA Communication System Having Variable Rate Channel Structure" filed in the Korean Industrial Property Office on Feb. 13, 1999 and assigned Serial No. 99-5269, the contents of which are hereby incorporated by reference.

BACKGROUND OF THE INVENTION

1. Field of the Invention

The present invention relates generally to a spreading device and method for a CDMA communication system, and in particular, to a device and method for allocating orthogonal codes in a variable data rate channel structure and spreading channels according to the allocation results.

2. Description of the Related Art

In order to increase channel capacity, a CDMA (Code Division Multiple Access) communication system spreads channels using orthogonal codes. For example, a forward link of an IMT-2000 system performs channel spreading using orthogonal codes. A reverse link can also perform channel spreading using the orthogonal codes through time alignment. An example of an orthogonal code that is typically used is a Walsh code. The number of available orthogonal codes is determined depending upon a modulation method and a minimum data rate.

The IMT-2000 system supports a data transmission service using a Supplemental Channel. The data being transmitted over the supplemental channel may include moving picture data (or circuit data), which should be transmitted in real time, and general packet data. Such data is transmitted at variable rates. For example, the Supplemental Channel can support data rates of 9.6 Kbps, 19.2 Kbps, 38.4 Kbps, 76.8 Kbps, 153.6 Kbps, 307.2 Kbps and 614.4 Kbps. The Walsh code has Walsh lengths (or spreading factors) of 256, 128, 64, 32, 16, 8 and 4 according to the respective data rates. In addition, a Forward Common Control Channel (F-CCCH) of the IMT-2000 system also supports the variable data rates. For example, the Common Control Channel can support the data rates of 9.6 Kbps, 19.2 Kbps and 38.4 Kbps. At this point, the Walsh codes have Walsh lengths (or spreading factors) of 256, 128 and 64 according to the respective data rates.

In the variable data rate channel scheme, a channel frame is transmitted at a specific rate, and the data rate can be varied during the frame transmission according to changes in the channel environment. In other words, when the channel environment improves during data transmission, the data transmission rate can be increased to a higher data rate. Otherwise, when the channel environment deteriorates, the data transmission rate can be decreased to a lower data rate. For example, the data rate of 19.2 Kbps can be varied to the higher data rates of 38.4 Kbps to 614.6 Kbps when the channel environment improves during the transmission, otherwise, the data rates of 19.2 Kbps can be varied to the lower data rate of 9.6 Kbps when the channel environment deteriorates. Here, the channel environment refers to all the factors which can affect the data transmission. An increase in the data rate according to the channel environment causes a decrease in the Walsh length, thus making it difficult to allocate the Walsh codes. FIG. 3 is a diagram for explaining such problems. Before describing the problems, a reference will first be made to FIGS. 1 and 2.

Figure 1:
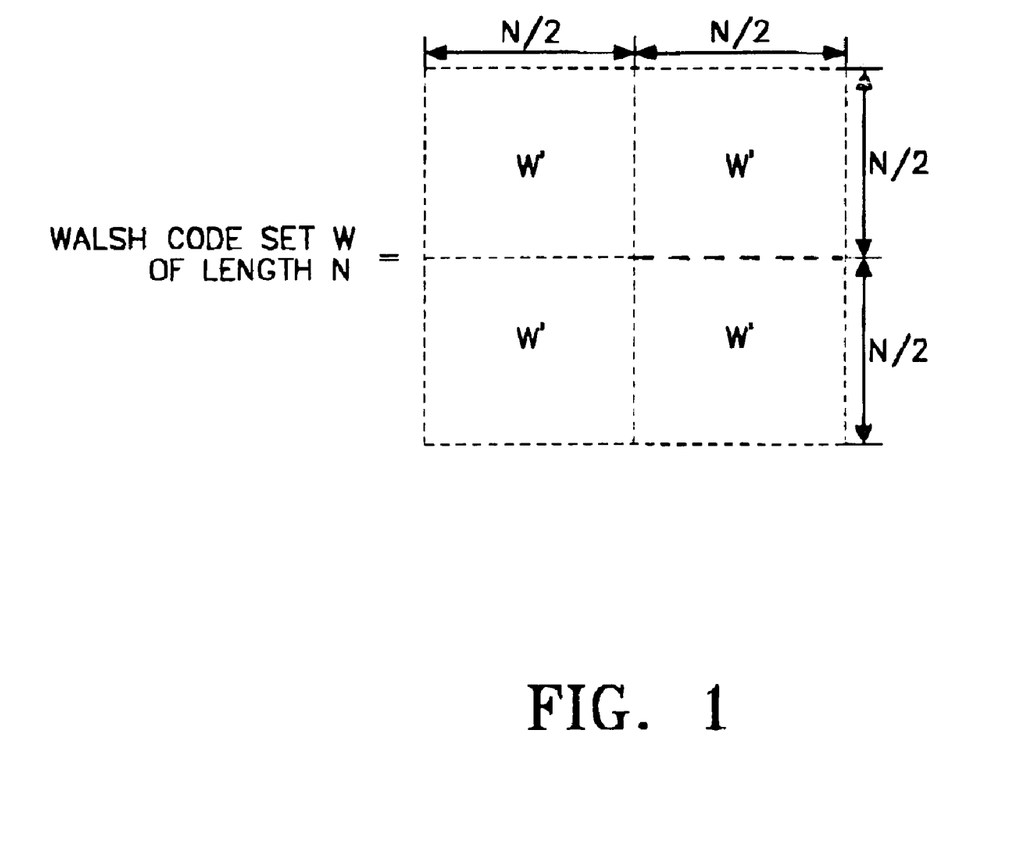
FIG. 1 is a diagram illustrating a structure of a general Walsh code set.

FIG. 1 shows a structure of the general Walsh code set. Referring to FIG. 1, a Walsh code set W is comprised of N Walsh codes having a Walsh length N, and can be divided into 4 Walsh code sets of length N/2. If it is assumed that a set of N/2 Walsh codes having a Walsh length N/2 is defined as a Walsh code set W', the two upper Walsh code sets of length N/2 are equivalent to the twice-repeated Walsh code set W'. Further, the lower left Walsh code set of length N/2 is equivalent to the above Walsh code set W', and the lower right Walsh code set of length N/2 is equivalent to an inverted Walsh code set $\overline{W'}$. For inversion of the Walsh code, a bit '1' is converted to '0' and a bit '0' to '1'.

Equation (1) below shows how to derive a Walsh code set of length 4 from a Walsh code set of length 2, in order to bring a better understanding of the Walsh code structure of FIG. 1. That is, the Walsh code set of length 4 corresponding to the above stated Walsh code set W, and the Walsh code set of length 2 corresponding to the above stated Walsh code set W'.

$$\begin{bmatrix} 0 & 0 \\ 0 & 1 \end{bmatrix} \Rightarrow \begin{bmatrix} 0 & 0 & 0 & 0 \\ 0 & 1 & 0 & 1 \\ 0 & 0 & 1 & 1 \\ 0 & 1 & 1 & 0 \end{bmatrix} \qquad \text{[Equation 1]}$$

Figure 2:
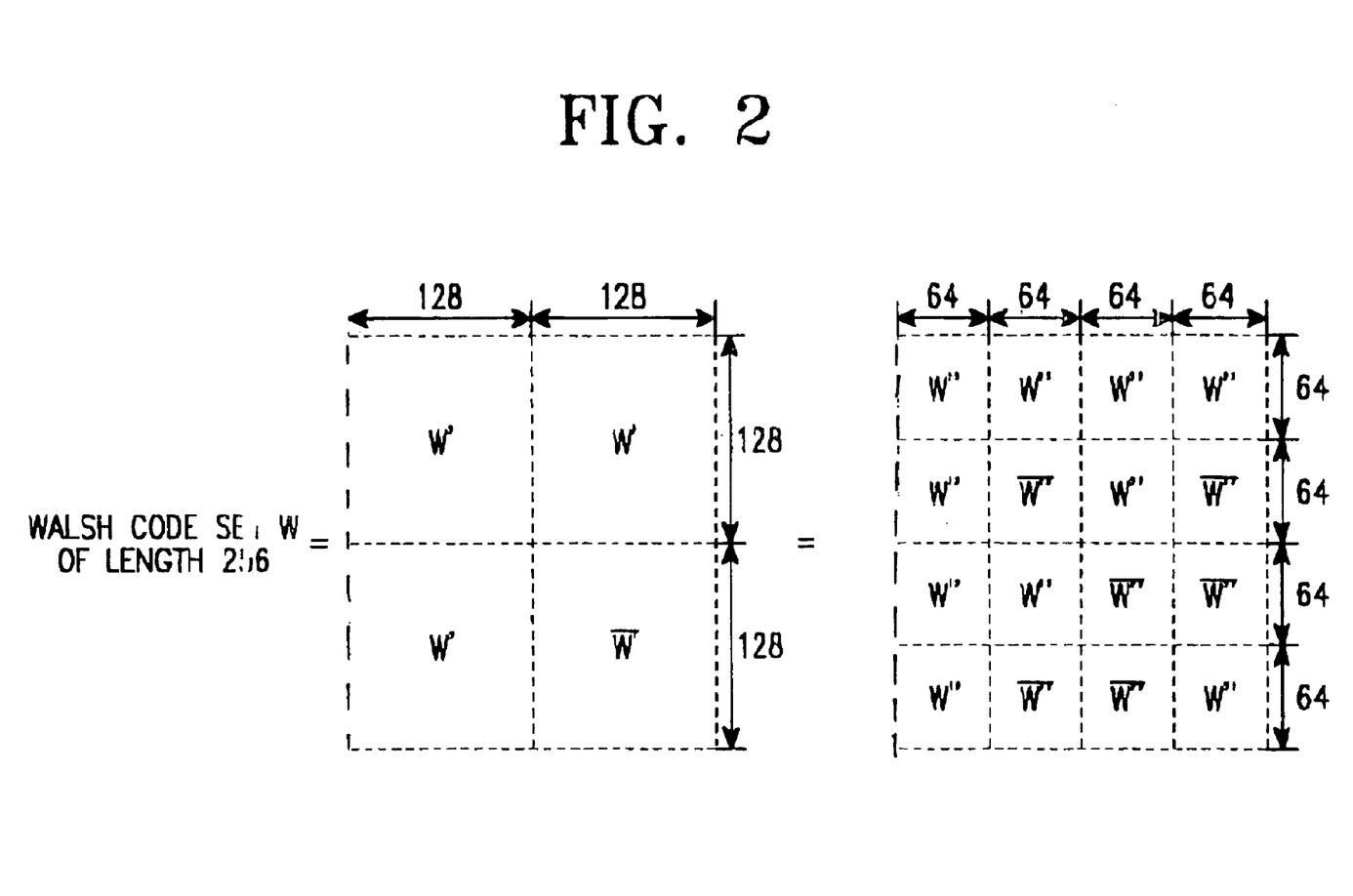
FIG. 2 is a diagram illustrating a set of Walsh codes having a Walsh code length of 256.
Figure 3:
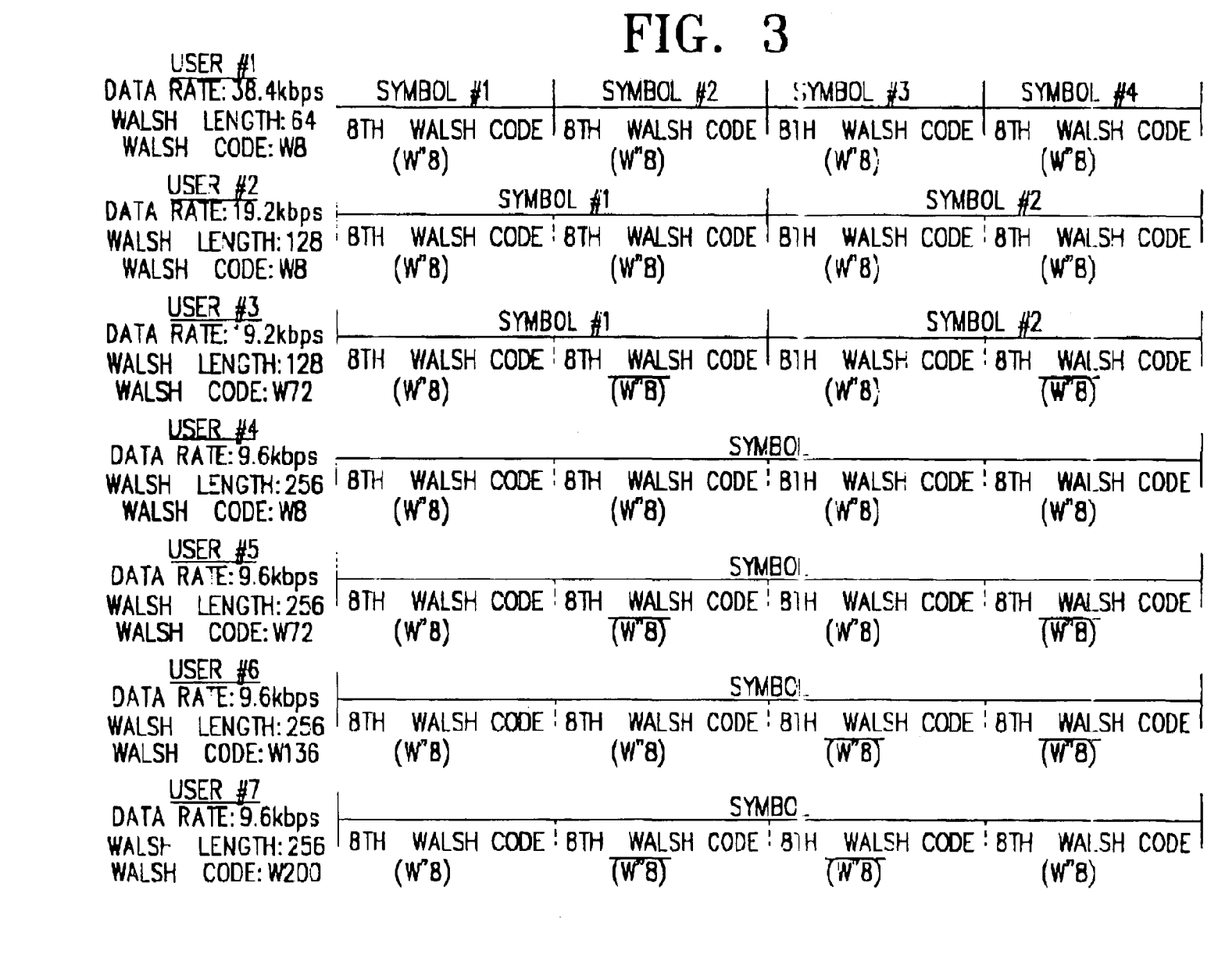
FIG. 3 is a diagram for explaining an interference occurring between users when the Walsh codes are allocated in a conventional method.

FIG. 2 shows a Walsh code set of length 256, which is obtained using the method of Equation (1). Referring to FIG. 2, a Walsh code set W is comprised of 256 Walsh codes having a Walsh length 256, and can be divided into 4 Walsh code sets of length 128. If it is assumed that a set of 128 Walsh codes having a Walsh length 128 is defined as a Walsh code set W', the two upper Walsh code sets of length 128 are equivalent to the twice-repeated Walsh code set W'. Further, the lower left Walsh code set of length 128 is equivalent to the above Walsh code set W', and the lower right Walsh code set of length 128 is equivalent to an inverted Walsh code set $\overline{W'}$.

In addition, if it is assumed that a set of 64 Walsh codes having a Walsh length 64 is defined as a Walsh code set W'', the two upper Walsh code sets of length 64 of each Walsh code set W'' are equivalent to the twice-repeated Walsh code set W''. Further, the lower left Walsh code set of length 64 of each Walsh code set W'' is equivalent to the above Walsh code set W'', and the lower right Walsh code set of length 64 is equivalent to an inverted Walsh code set $\overline{W''}$. Here, the structure of the Walsh code set W' is commonly applied to all the Walsh code sets W' constituting the Walsh code set W. Further, the Walsh code set $\overline{W'}$ is also constituted in the same structure as that of the Walsh code set W' as disclosed in the above. By using such structure of the Walsh codes, it is possible to reduce an interference (or correlation) between the users.

FIG. 3 shows a correlation between two users according to the Walsh codes when the data rate is variable according to the channel environments. Referring to FIG. 3, a first user uses an $8^{th}$ Walsh code (which is a Walsh code having a Walsh number 8) at a data rate of 38.4 Kbps. A Walsh code of length 64 should be used to transmit data at the data rate of 38.4 Kbps. Therefore, the data of the first user is spread with an $8^{th}$ Walsh code of length 64 and transmitted at the data rate of 38.4 Kbps as stated above. At this data rate, it is possible to transmit 4 times the data which can be transmitted at the data rate of 9.6 Kbps. This becomes apparent when compared with the data transmission method of a fourth user, who transmits the data at the data rate of 9.6 Kbps using an $8^{th}$ Walsh code of length 256. More specifically, with regard to the data transmission method of the first user, a first code symbol is spread with a first 64-chip Walsh code (i.e., first 64 chips of the $8^{th}$ Walsh code), a second code symbol is spread with a second 64-chip spreading code (i.e., second 64 chips of the $8^{th}$ Walsh code), a third code symbol is spread with a third 64-chip Walsh code (i.e., third 64 chips of the $8^{th}$ Walsh code), and a fourth code symbol is spread with a fourth 64-chip Walsh code (i.e., fourth 64 chips of the $8^{th}$ Walsh code).

A second user uses the $8^{th}$ Walsh code at a data rate of 19.2 Kbps. A Walsh code of length 128 should be used to transmit data at the data rate of 19.2 Kbps. Therefore, the data of the second user is spread with the $8^{th}$ Walsh code of length 128 and transmitted at the data rate of 19.2 Kbps. At this data rate, it is possible to transmit 2 times the data which can be transmitted at the data rate of 9.6 Kbps. This becomes apparent when compared with the data transmission method of the fourth user, who transmits the data at the data rate of 9.6 Kbps using the $8^{th}$ Walsh code of length 256. More specifically, with regard to the data transmission method of the second user, a first code symbol is spread with a first 128-chip Walsh code (i.e., leading 128 chips of the $8^{th}$ Walsh code), and a second code symbol is spread with a second 128-chip Walsh code (i.e., following 128 chips of the $8^{th}$ Walsh code).

A third user uses a $72^{th}$ Walsh code of length 128 at the data rate of 19.2 Kbps. Two transmission symbols are spread with the corresponding 128-chip Walsh codes (72' Walsh code).

Further, the fourth to seventh users use their unique Walsh codes of length 256 at the data rate of 9.6 Kbps. Each transmission symbol is spread with a 256-chip Walsh code. The unique Walsh codes used by the fourth to seventh users are 8', 72', 136' and $200^{th}$ Walsh codes, respectively.

Next, reference will be made to an interference among the users using the different data rates and Walsh codes.

First, a description will be made of an interference between the first user and the third user on a 64-chip unit basis. The first symbol of the first user and the corresponding duration of the third user are spread with the same Walsh code W"8, thus causing an interference between the first user and the third user. That is, at the corresponding duration, the first user has an interference with the third user. This interference also occurs at the third symbol duration of the first user and the corresponding chip duration of the third user. Therefore, while transmitting the data of the first user, it is not possible to transmit the data of the third user.

Next, a description will be made of an interference between the first user and the fifth to seventh users on the 64-chip unit basis. The first symbol of the first user and the corresponding duration of the fifth to seventh users are spread with the same Walsh code W"8, thus causing an interference between the first user and the fifth to seventh users. That is, at the corresponding duration, the first user has a interference with the fifth to seventh users. This interference occurs at the third symbol duration of the first user and the corresponding chip duration of the fifth user; at the second symbol duration of the first user and the corresponding duration of the sixth user; and at the fourth symbol duration of the first user and the corresponding duration of the seventh user. Therefore, while transmitting the data of the first user, it is not possible to transmit the data of the fifth to seventh users.

In other words, when there exists a user using a Walsh code of short length such as the first user, the users using Walsh codes of the longer length cannot use some of the Walsh codes due to the bad correlation property.

For example, when there exists a user using an n-th Walsh code $W_n$, $(0 \leq n \leq 64)$ of length 64 for a Walsh code of full length 256, a user using the longer Walsh length cannot use not only the n-th Walsh code $W_n$ but also (n+64)th, (n+128)th and (n+192)th Walsh codes $W_{n+}64$, $W_{n+}128$ and $W_{n+}192$. That is, several Walsh codes cannot be used because of one user. At this point, an increase in the data rate of the user will cause a decrease in the Walsh length, thus increasing the number of unavailable Walsh codes.

As stated above, the data rate of the users varies depending on the channel environment, and the maximum data rate is initially determined by a base station. After determination of the maximum data rate, the unavailable Walsh codes are determined. At this point, it should be noted that the user does not always communicate at the maximum data rate. Therefore, not using the Walsh codes which are unavailable for the maximum data rate, even when communication is performed at a data rate lower than the maximum data rate, resulting in the inefficient use of the Walsh codes.

SUMMARY OF THE INVENTION

It is, therefore, an object of the present invention to provide a device and method for making it possible to use some of the unavailable, orthogonal codes when the user communicates at a non-maximum data rate in a CDMA communication system having a variable data rate channel structure.

It is another object of the present invention to provide an orthogonal code allocation device and method for maximizing utilization efficiency of Walsh codes according to a variation of the data rate in a CDMA communication system having a variable data rate channel structure.

It is further another object of the present invention to provide a device and method for generating a Walsh code pool to increase utilization efficiency of the Walsh codes.

To achieve the above objects, there is provided a channel spreading device for a CDMA communication system. The channel spreading device includes a storage medium for storing orthogonal code numbers which cannot maintain an orthogonality when an orthogonal code for a maximum data rate is used; a controller for determining whether the respective orthogonal code numbers stored in the storage medium are available at a given data rate, when at least one data user requests data transmission at the given data rate, and outputting the determined available orthogonal code numbers and control signals according to the determination result; a plurality of channel transmitters, provided in association with the orthogonal code numbers from the controller, for spreading data from the data user with an orthogonal code corresponding to the orthogonal code number from the controller; and a plurality of multipliers for multiplying outputs of the channel transmitters by control signals from the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The terms "orthogonal spreading" and "channel spreading" as used herein have the same meaning, and the terms "orthogonal code and Walsh code as used herein also have the same meaning. Further, the term "user" refers to a subscriber requiring data transmission, and refers to data of a corresponding channel from the viewpoint of the system.

The invention will be described with reference to an embodiment wherein an IMT-2000 base station performs channel spreading by using the Walsh code as stated above, and the invention can also be applied to the systems using the different data rates.

In the following embodiment, description will be made regarding a device utilizing the Walsh codes and a method therefor.

Conventionally, a user using an n-th Walsh code $W_n$ ($0 \leq n \leq 64$) of length 64 for a Walsh code of full length 256 cannot operate simultaneously with a user, using not only the n-th Walsh code $W_n$ but also (n+64)th, (n+128)th and (n+192)th Walsh codes ($W_{n+}64$, $W_{n+}128$ and $W_{n+}192$) and having a longer Walsh length. If it is assumed that a primary user uses an n-th Walsh code $W_n$ ($0 \leq n \leq R$) of length R for the maximum data rate, a set $\{W_{n+iR|} 0 \leq i < (256/R)\}$, where 256 indicates the full length of the Walsh code, will be referred to as a Walsh pool. In the above case, the Walsh pool is $\{W_n, W_{n+}64, W_{n+}128, W_{n+192}\}$.

In addition, when the user uses a data rate lower than the determined maximum data rate, there is an available Walsh code in the Walsh pool. Therefore, a description will be made of a device for transmitting the user data, which can be transmitted discontinuously, at an available data rate. For example, the supplemental channel supports a circuit data user for transmitting real-time data such as moving pictures and a packet data user for transmitting packet data such as E-mail, which can be transmitted discontinuously. The circuit data user cannot tolerate delay in data transmission because the moving picture should be transmitted continuously. However, the packet data user can tolerate some delay in data transmission because the E-mail can be transmitted discontinuously. Therefore, when there exists a circuit data user, it is determined whether there is any available Walsh code. When there is an available Walsh code, the Walsh code is first allocated to the circuit data user. At this moment, by defining the circuit data user as a primary user, a Walsh pool according to the Walsh length corresponding to the maximum data rate is created. Thereafter the available Walsh codes in the created Walsh pool are allocated to the packet data users, who can tolerate the transmission delay. Therefore, when the circuit data user decreases its data rate, an available Walsh code in the Walsh pool, if any, is allocated to the packet data user to transmit the packet data. However, when the circuit data user uses the maximum data rate, all the packet data users are suspended.

More specifically, the Walsh pool is allocated on the basis of the circuit data user. Thereafter, when there exists a packet data user, a Walsh number in the Walsh pool is allocated for the packet data user. Further, when there exist several circuit data users, thus several corresponding Walsh pools are created and there exists a new packet data user, one of the Walsh numbers is selected from the Walsh pool according to priority of the packet data user. For example, when the packet data user having the higher priority attempts a call, a Walsh code guaranteeing the better service is selected from the several Walsh pools. Otherwise, when the packet data user having the lower priority attempts a call, a Walsh code having a higher probability of service delay is selected from the several Walsh pools. Further, when there existed several small-sized Walsh pools and the circuit data user having the maximum data rate attempts a call, the circuit data user will create its Walsh pool. At this point, there may exist a Walsh pool not having the availability of new creation of Walsh pool but having already created small-sized Walsh pools. In this circumstance, when there exists a circuit data user using a Walsh code in the small-sized Walsh pools, a new Walsh pool will not be created. Otherwise, when there does not exist a circuit data user using a Walsh code in the small-sized Walsh pools, a large Walsh pool including the small-sized Walsh pool is created. When constituting the new Walsh pool including the existing Walsh pools, the Walsh code numbers of packet data users in communication may be newly allotted according to the changes of the Walsh pools or may include the existing Walsh pools naturally, maintaining the allotted Walsh code numbers.

The present invention will be only described with reference to an embodiment wherein the Walsh pool is created on the basis of the circuit data user in the Supplemental Channel. However, the invention can also be applied to the case where the Walsh pool is created on the basis of the user having the higher priority packet data in the variable data rate channel structure and the Walsh codes in the Walsh pool are allocated for the other users. Further, the invention can also be applied to the Forward Common Control Channel. In this case, data transmission is performed at the variable data rate, but there exists no circuit data user. Therefore, when the invention is applied to the Forward Common Control Channel, the circuit data user can be replaced by the control channel having the higher priority.

EMBODIMENT

Figure 4:
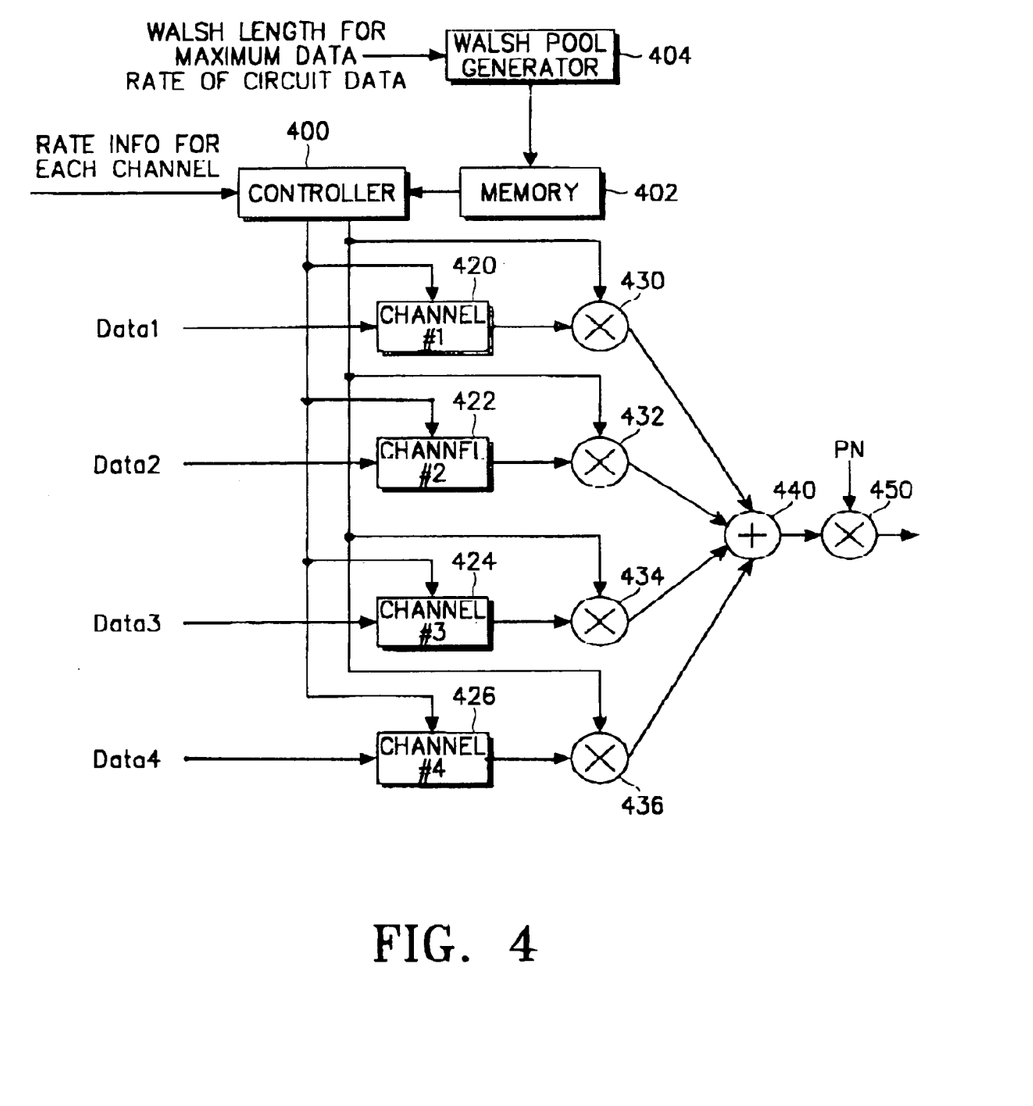
FIG. 4 is a block diagram illustrating a channel spreading device for controlling channel transmitters depending on a Walsh pool, according to an embodiment of the present invention.

FIG. 4 shows a device for controlling transmission of several channels using a Walsh pool according to an embodiment of the present invention. Referring to FIG. 4, when there exists a circuit data user, it is determined whether there are any available Walsh codes, and when there exists an available Walsh code, the Walsh code is first allocated to the circuit data user. This circuit data user will be referred to as a primary user. A Walsh length corresponding to the maximum data rate for the primary user is provided to a Walsh pool generator 404. Then, the Walsh pool generator 404 calculates a Walsh pool, which is a set of the Walsh code numbers and length which are unavailable when the circuit data user communicates at the maximum data rate, and stores the calculated Walsh pool in a memory 402. Thereafter, data rate information for one circuit data user, who communicates with a Walsh code number in the Walsh pool in the Walsh pool stored in the memory 402, and a plurality of packet data users can be provided Walsh code numbers in the Walsh pool by a controller 400. The controller 400 then examines the data rate of the circuit data user to determine whether there exists any available Walsh code number in the Walsh pool for the data rate of the packet data user. When there exists an available Walsh code numbers, a specific packet data users assigned the available Walsh code numbers can transmit the packet data. However, for the other packet data users to which the available Walsh code numbers are not allocated, the controller 400 generates control signals for suppressing transmission of the packet data, and provides the generated control signals to associated multipliers 430–436. The multipliers 430–436 are controlled by the control signals from the controller 400 to selectively control the outputs of the channel transmitters 420–426. Upon receipt of input data, the channel transmitters 420–426 generate transmission signals using the Walsh codes provided from the controller 400 and provide the generated transmission signals to the multipliers 430–436. Here, the control signals from the controller 400 is expressed in '1'or '0'. For example, the controller 400 outputs the control signal of '1' when a Walsh code for the corresponding channel is available, and generates the control signal of '0' when a Walsh code for the corresponding channel is unavailable. The control signal is multiplied by the output of the channel transmitter for the corresponding channel, so that the multiplier passes the output signal of the channel transmitter when the Walsh code for the corresponding channel is available, and outputs '0' when the Walsh code for the corresponding channel is unavailable. The output signals of the multipliers 430–436 are added by an adder 440. An output signal of the adder 440 is multiplied by a PN (Pseudo Noise) code using a multiplier 450 to output a PN spread signal.

The controller 400 examines the data rate of the circuit data user to determine whether there exists any available Walsh code numbers in the Walsh pool for the data rate of the packet data user. The controller 400 enables the transmitter having the available Walsh code number to transmit the data, and enables the transmitter not having the available Walsh code to suppress data transmission. Table 1 below shows the transmittable channels and the suppressed channels according to the data rates of the circuit data user.

TABLE 1

| Walsh User in Walsh Pool | Case 1 | Case 2 | Case 3 | Case 4 |
|---|---|---|---|---|
| Circuit Data User ($W_8$) | 38.4 Kbps | 19.2 Kbps | 19.2 Kbps | 9.6 Kbps |
| Packet Data User ($W_{72}$) | | 19.2 Kbps | 9.6 Kbps | 9.6 Kbps |
| Packet Data User ($W_{136}$) | | | | 9.6 Kbps |
| Packet Data User ($W_{200}$) | | | 9.6 Kbps | 9.6 Kbps |

With reference to Table 1, in Case 1, the circuit data user (i.e., primary user) using the $8^{th}$ Walsh code number $W_8$ transmits the circuit data at the data rate of 38.4 Kbps and at this point, the other users using the Walsh code number $W_{72}$, $W_{136}$ and $W_{200}$ cannot transmit the packet data. In Case 2, the circuit data user using the $8^{th}$ Walsh code number $W_8$ transmits the circuit data at the data rate of 19.2 Kbps. At this point, the packet data user using the $72^{th}$ Walsh code number $W_{72}$ can transmit the packet data at the data rate of 19.2 Kbps and the other users using the Walsh code numbers $W_{36}$ and $W_{200}$ cannot transmit the packet data. Alternatively, the packet data user using the $200^{th}$ Walsh code number $W_{200}$ can transmit the packet data at the data rate of 19.2 Kbps and the other users using the Walsh code numbers $W_{72}$ and $W_{136}$ cannot transmit the packet data. In Case 3, the circuit data user using the $8^{th}$ Walsh code number $W_8$ transmits the circuit data at the data rate of 19.2 Kbps and the packet data user using the $72^{th}$ Walsh code number $W_{72}$ transmits the packet data at the data rate of 9.6 Kbps. At this point, the packet data users using the $200^{th}$ Walsh code number $W_{200}$ can transmit the packet data at the data rate of 9.6 Kbps and the other user using the Walsh code number $W_{136}$ cannot transmit the packet data. In Case 4, all the users using the Walsh code numbers $W_8$, $W_{72}$, $W_{136}$ and $W_{200}$ transmit the data at the data rate of 9.6 Kbps.

The Walsh pool shown in Table 1 is generated by the Walsh pool generator 404 and stored in the memory 402. More specifically, a detailed description will now be made of how to generate the Walsh pool.

The Walsh pool is generated when a circuit data transmission request occurs, i.e., when there exists the circuit data user. When a circuit data transmission request occurs, a first available Walsh code number is allocated. Thereafter, when there occurs a packet data transmission request, second Walsh code numbers corresponding to the allocated first available Walsh code numbers are allocated. In Table 1, the Walsh code number $W_8$ is the first Walsh code allocated by the circuit data transmission request, and the Walsh code numbers $W_{72}$, $W_{136}$ and $W_{200}$ are the second Walsh codes to be used when the packet data transmission request occurs. The allocated second Walsh code numbers are used for transmitting the packet data. When it is assumed that the Walsh length for the maximum data rate is R and the n-th Walsh code ($0 \leq n < R$) is used, the relationship between the first Walsh code number and the second Walsh code number can be explained by a set $\{W_{n+iR} 0 \leq i < (256/R)\}$. After one first Walsh code number is allocated, Walsh code number corresponding to the first Walsh code number is allocated as the second Walsh code number. Here, the Walsh code number which can be allocated as the second Walsh code number is determined by sequentially adding the Walsh number of the first Walsh code to the positive multiples of the Walsh length R. A detailed description of a method for determining the Walsh code numbers will be made later with reference to FIG. 6. Meanwhile, the number of the determined Walsh codes is equivalent to a value determined by subtracting one from a value determined by dividing the full length (i.e., 256 in the embodiment) of the Walsh code by the Walsh length R. For example, when the $8^{th}$ Walsh code number $W_8$ is allocated as the first Walsh code number, the Walsh codes having the Walsh numbers '8+64', '8+128' and '8+192 ' determined by adding the Walsh length '8' to the multiples '64*1', '64*2' and '64*3' of the Walsh length 64 are allocated as the second Walsh code numbers. The full length of the Walsh code is 256 and the Walsh length is 64. That is, since 256/64=4, 3 Walsh codes are allocated as the second Walsh code numbers.

To generate the Walsh pool, the second Walsh code numbers are generated using the Walsh code number of the first Walsh code number. Therefore, actually, the Walsh pool generator 404 generates the Walsh numbers rather than the Walsh codes. Meanwhile, the memory 402 stores the Walsh code numbers corresponding to the generated Walsh code numbers and provides the Walsh code numbers to the controller 400 at the request of the controller 400.

Figure 5:
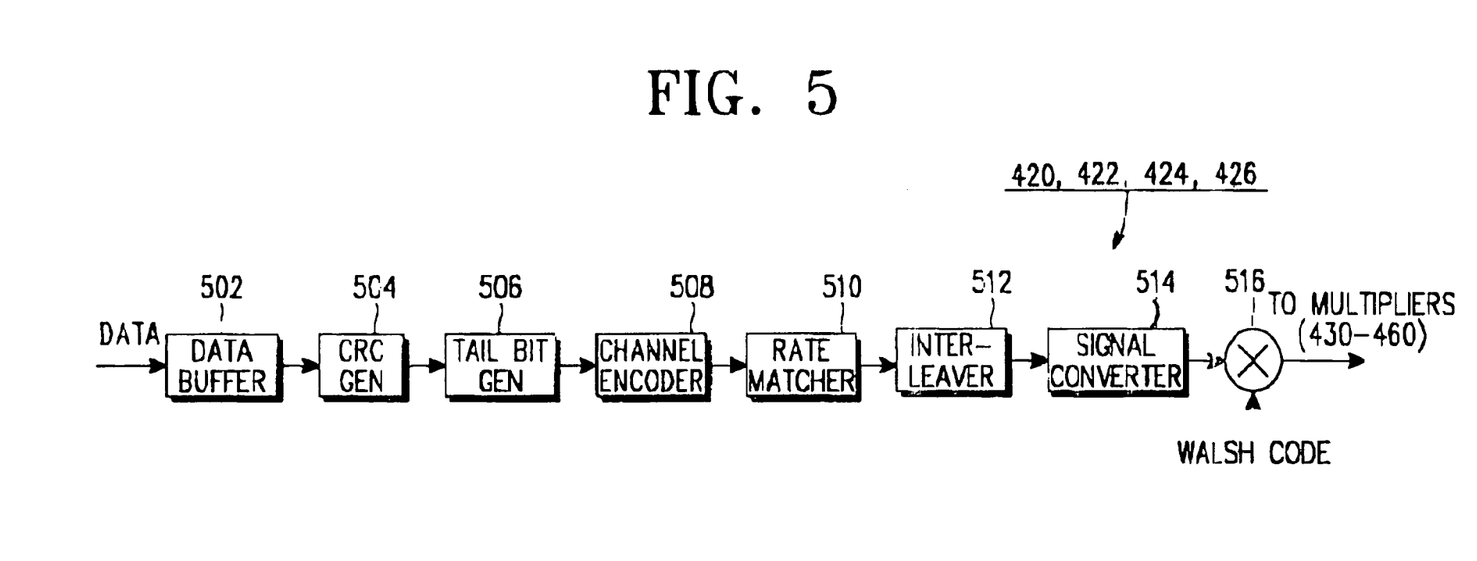
FIG. 5 is a block diagram illustrating the channel transmitter of FIG. 4.

FIG. 5 shows a detailed structure of the channel transmitters 420–426 of FIG. 4. Referring to FIG. 5, a data buffer 502 temporarily stores input transmission data and ready data for transmission. A CRC (Cyclic Redundancy Code) generator 504 generates a 16-bit CRC according to received frame data and adds the generated CRC to the received frame data. A tail bit generator 506 generates 8 tail bits for indicating termination of the received data frame and adds the generated tail bits to the data frame output from the CRC generator 504. A channel encoder 508 encodes the frame data output from the tail bit generator 506. A Convolutional Encoder or a Turbo Encoder can be typically used for the channel encoder 508. A rate matcher 510 matches symbol rates of the coded data output from the channel encoder 508. The rate matcher 510 is comprised of a symbol repeater and a symbol deleter. An interleaver 512 interleaves the output of the rate matcher 510. A signal converter 514 converts levels of the data output from the interleaver 512 by converting a data bit '0' to '+1' and a data bit '1' to '−1'. A multiplier 516 multiplies the output of the signal converter 514 by a Walsh code.

Figure 6:
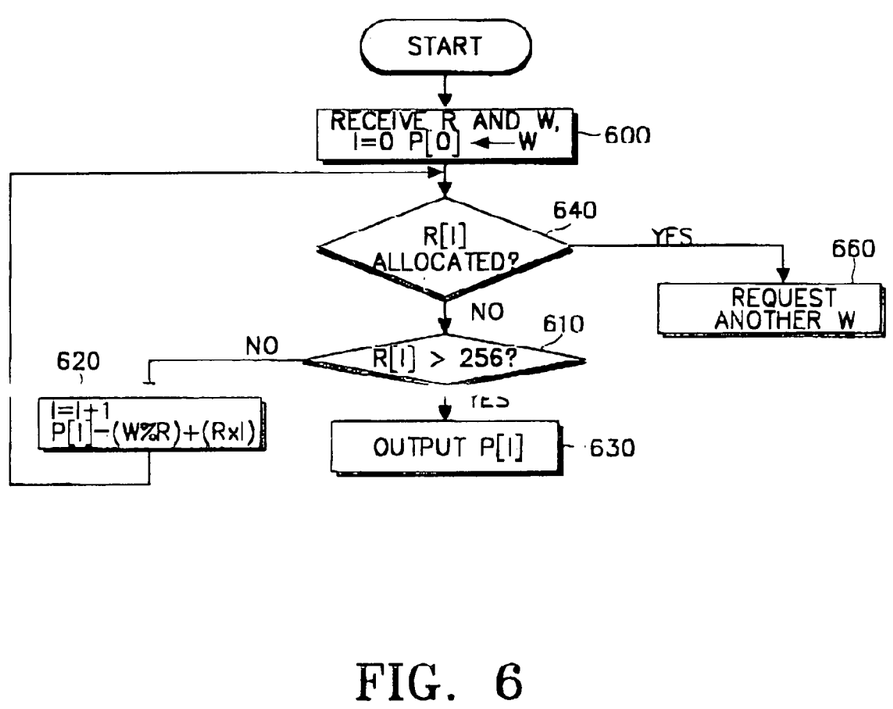
FIG. 6 is a flow chart illustrating a procedure for generating a Walsh pool in the Walsh pool generator of FIG. 4.

FIG. 6 shows a procedure for generating a Walsh pool in the Walsh pool generator 404. Referring to FIG. 6, the Walsh pool generator 404 receives a Walsh length, R, for the maximum data rate of the circuit data and a Walsh code number, W, of the circuit data, and initializes an index, I, of the Walsh code numbers in the Walsh pool and an (I+1)th Walsh code number to '0' in step 600. Here, W should be allocated in consideration of the existing Walsh pool. That is, the procedure of FIG. 6 starts, when the Walsh pool for a desired maximum data rate can be generated using the unused Walsh code number. Further, in step 600, the Walsh pool generator 404 sets the Walsh code number of the input circuit data to an initial Walsh code number P[0].

After initialization, the Walsh pool generator 404 determines in step 640 whether the P[0] is a primitive code number indicating a previously allocated Walsh code number. As described above, it is meaningless to generate a Walsh pool corresponding to the Walsh code number presently in use. Therefore, when the corresponding Walsh code number is presently in use, the Walsh pool generator 404 requests another Walsh number for the circuit data, in step 660. Otherwise, when the corresponding Walsh code number is a non-allocated Walsh code number, the Walsh pool generator 404 determines in step 610 whether the presently determined Walsh code number P[I] is higher than 256 which is the full length of the Walsh code. When the condition of step 610 is not satisfied (i.e., (P[I]≦256)), the Walsh pool generator 404 increases I by one and then calculates an I-th Walsh code number P[I], in step 620.

When it is assumed that the Walsh length for the maximum data rate of the primary user is R and the n-th Walsh code number $W_n$ (0≦n<64) is used, the Walsh pool is generated by a set $\{W_n+iR|0≦i<(256/R)\}$ in step 600. That is, P[I] includes the Walsh code number of the primary user and the Walsh code numbers having the Walsh length R for the maximum data rate of the primary user. Thereafter, the Walsh pool generator 404 returns to step 640 to determine whether P[I] is a Walsh code number presently in use. When the Walsh code number is presently in use by another user, the Walsh pool generator 404 requests another Walsh code number W for the circuit data in step 660. Otherwise, when the Walsh code number is not in use, the Walsh pool generator 404 repeats the above process. Therefore, in step 620, the Walsh pool generator 404 calculates the values '8+64', '8+2*64' and '8+3*64', when the Walsh number W=8 and the Walsh length R=64 R(the Walsh length according to the maximum data rate of the circuit data). These Walsh numbers are the second Walsh numbers. The Walsh code numbers according to the above calculation become the second Walsh code numbers as defined in the above. In the same method, the Walsh pool generator 404 continuously calculates P[I]. In the meantime, when P[I] exceeds 256, the Walsh pool generator 404 outputs P[I] values calculated up to now, in step 630. The P[I] values are stored in the memory 402 together with the corresponding Walsh code numbers.

In the above process, when there exists several Walsh pools, a new Walsh pool for the circuit data user is generated in step 640.

Figure 7:
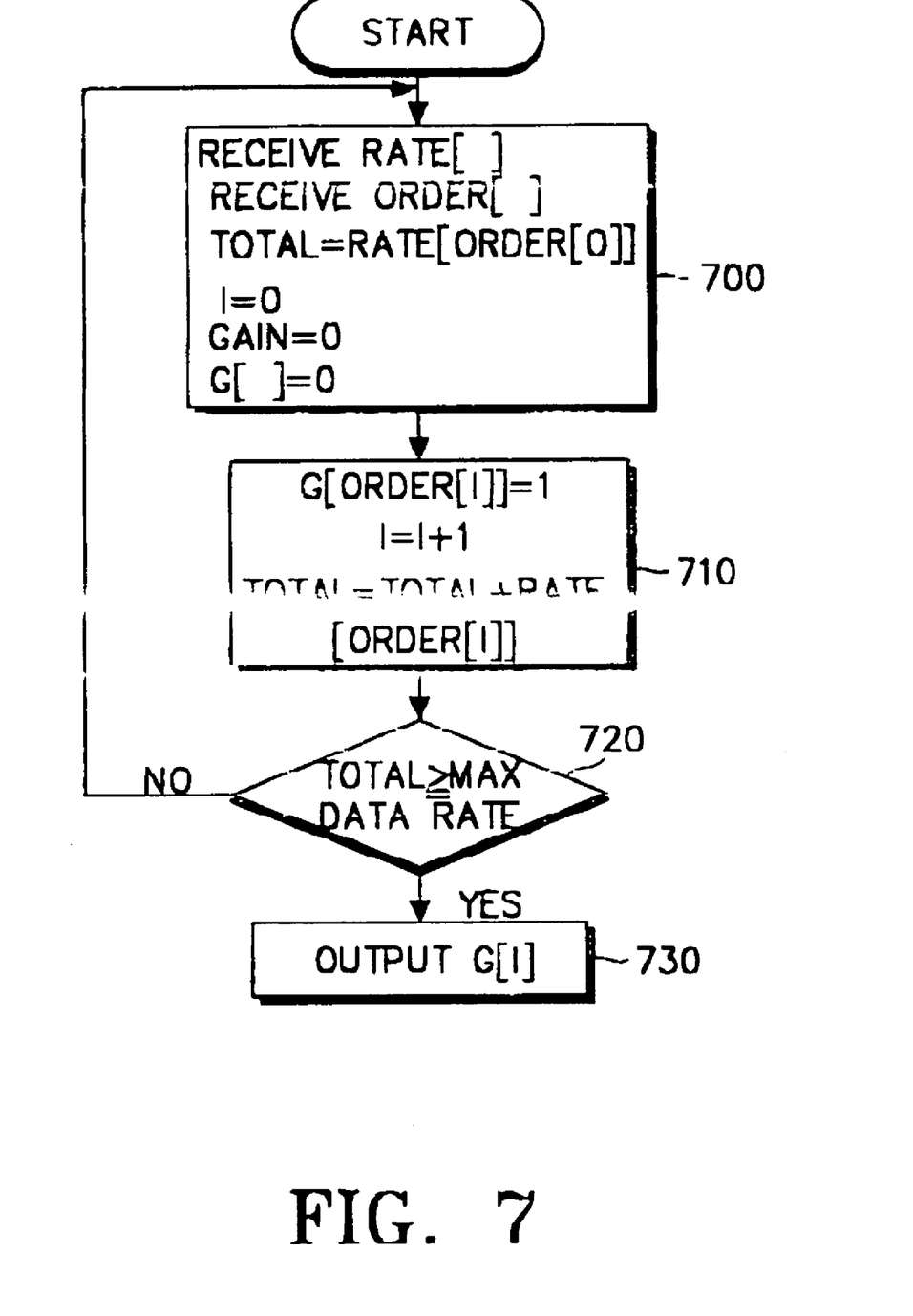
FIGS. 7 and 8 are flow charts illustrating a procedure for generating control signals for the Walsh users by the controller of FIG. 4.

FIG. 7 shows a procedure for the controller 400's allocating Walsh code numbers using the Walsh pool created by the procedure of FIG. 6 in the controller 400. The controller 400 examines the data rate of the circuit data to determine whether there exists any available Walsh code numbers in the Walsh pool. In accordance with the examination results, the controller 400 enables the user having the available Walsh code number to transmit the data and suppresses data transmission for the other users corresponding to the unavailable Walsh code number to suppress data transmission. To suppress data transmission of a specific user, the controller 400 should operate before a boundary of a new frame.

Referring to FIG. 7, in step 700, the controller 400 receives data rates Rate[ ] of the channels corresponding to the Walsh code numbers in the Walsh pool and is provided the Walsh codes constituting the Walsh pool from the memory 402. Further, the controller 400 receives Order[ ] indicating the priority of the channels and the order of the available Walsh code numbers. In addition, the controller 400 initializes the sum, TOTAL, of the data rates to the data rate of the primary user, and initializes the index, I, of the Walsh codes in the Walsh pool and a power control signal G[ ] for the I-th user to '0'. Thereafter, in step 710, the controller 400 sets a power control signal G[Order[I]] of the I-th user to '1' and adds a data rate Rate[Order[I]] of the (I+1)th user to TOTAL. The controller 400 then determines in step 720 whether TOTAL, which is the sum of the data rates for the users up to now, is higher than or equal to the maximum data rate of the primary user. When the sum, TOTAL, of the data rates is lower than the maximum data rate, the controller 400 returns to step 710, to set the power control signal G[Order[I] for the next user to '1' and add the data rate of the next user to TOTAL. Otherwise, when TOTAL is higher than or equal to the maximum data rate, the controller 400 outputs the power control signals G[I] determined up to now to the adders 430–436 of FIG. 4, in step 730.

More specifically, the sum of the data rates for the users in each Case of Table 1 is 38.4 Kbps. Therefore, the controller 400 is implemented such that the sum of the data rates should not exceed the maximum data rate.

Figure 8:
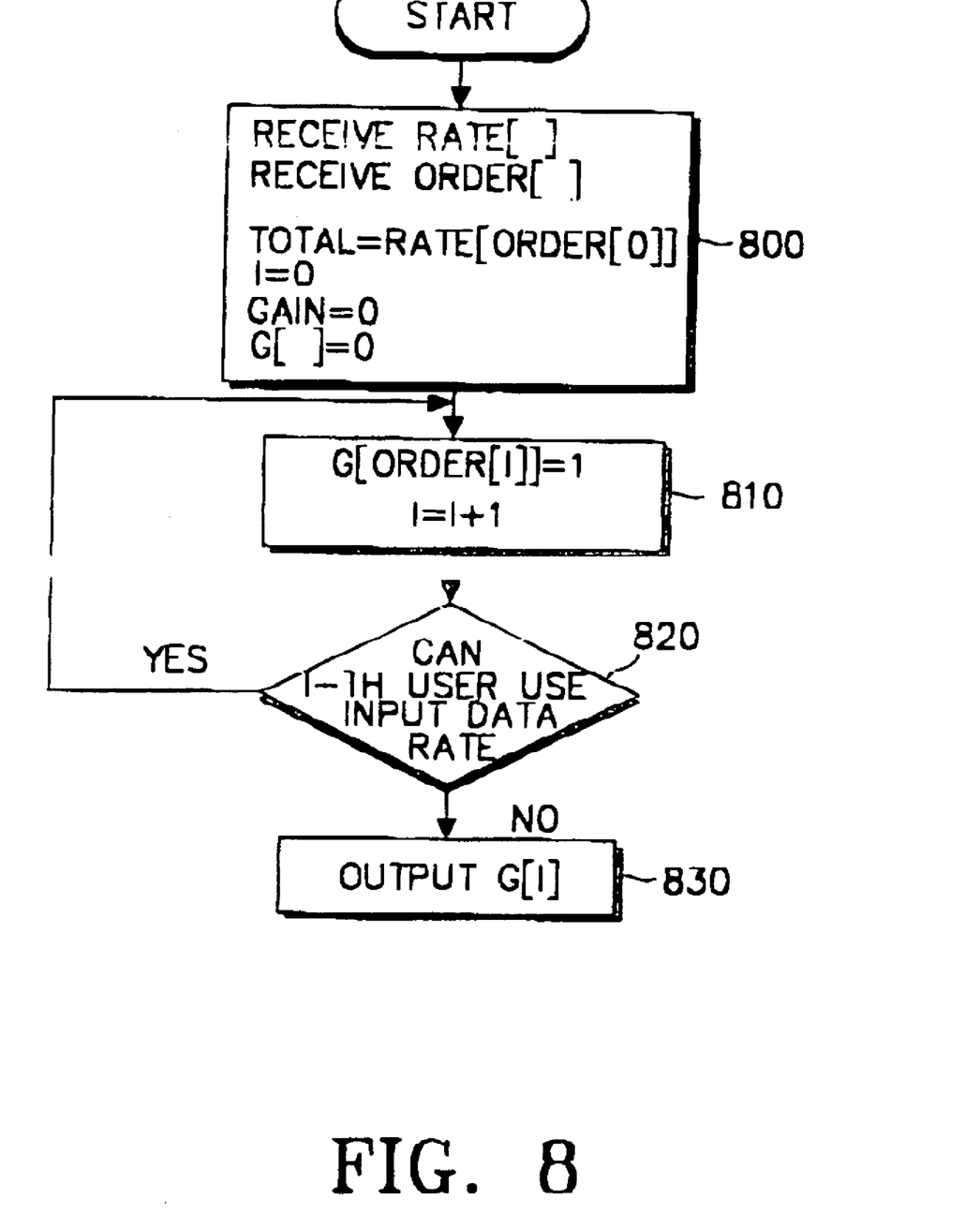

FIG. 8 shows a more general operation of controller 400. Referring to FIG. 8, in step 800, the controller 400 receives data rates Rate[ ] of the channels corresponding to the Walsh codes in the Walsh pool and is provided the Walsh codes constituting the Walsh pool from the memory 402. Further, the controller 400 receives Order[ ] indicating the priority of the channels and the order of the available Walsh numbers. In addition, the controller 400 initializes the sum, TOTAL, of the data rates to the data rate of the primary user, and initializes the index, I, of the Walsh codes in the Walsh pool and a power control signal G[ ] for the I-th user to '0'. Thereafter, in step 810, the controller 400 sets a power control signal of the I-th user to '1'. Thereafter, the controller 400 determines in step 820 whether the (I+1)th user (having the next higher priority to the user having the I-th priority) can use the input data rate. When the next user (i.e., (I+1)th user) can use the input data rate, the controller 400 returns to step 810 to set a power control signal of the (I+1)th user to '1'. Otherwise, when the next user cannot use the input data rate, the controller 400 sets the control signals of the usable users to '1' and the control signals of the unusable users to '0' and outputs the power control signals, in step 830.

As described above, in the CDMA communication system having the variable rate channel structure, when the circuit data is transmitted at a data rate lower than the maximum data rate, the Walsh code numbers determined by the Walsh length corresponding to the maximum data rate are used as Walsh code numbers for transmitting the packet data. Therefore, it is possible to prevent a waste of the Walsh codes, thus contributing to efficient utilization of the Walsh code resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel spreading device for a CDMA (Code Division Multiple Access) communication system, comprising:
   a plurality of channel transmission circuits;
   a memory for storing only orthogonal code numbers which cannot maintain orthogonality due to an orthogonal code which a circuit data user uses at a maximum data rate; and
   a controller for reading from the memory an orthogonal code number used at the maximum data rate to primarily allocate the read orthogonal code number such that circuit data is spread and transmitted by a corresponding one of the channel transmission circuits, when there is data transmission request from the circuit data user and a packet data user, and reading an available orthogonal code number out of the orthogonal code numbers stored in the memory to allocate the read orthogonal code number such that packet data is spread and transmitted by a corresponding one of the channel transmission circuits.

2. The channel spreading device as claimed in claim 1, further comprising a Walsh pool generator for generating orthogonal code numbers which cannot maintain an orthogonality with an orthogonal code used at the maximum data rate by the circuit data user, when said orthogonal code is in use.

3. The channel spreading device as claimed in claim 2, wherein the Walsh pool generator sequentially adds multiples of an orthogonal code length used at the maximum data rate to the orthogonal code number used at the maximum data rate within a full length of the orthogonal code, so as to generate orthogonal code numbers.

4. The channel spreading device as claimed in claim 1, wherein the controller determines whether it is possible to transmit the packet data at a data rate requested by the circuit data user, and determines, when the packet data can be transmitted, an orthogonal code number which is available at the data rate requested by the packet data user.

5. The channel spreading device as claimed in claim 4, wherein the controller allocates the available orthogonal codes according to a priority of the packet data users when at least two packet data users request transmission of packet data at a given data rate.

6. The channel spreading device as claimed in claim 1, wherein the channel transmission circuit spreads the circuit data with an orthogonal code corresponding to an orthogonal code number for the maximum data rate out of the orthogonal codes from the controller.

7. A channel spreading device for a CDMA communication system, comprising:
   a storage medium for storing only orthogonal code numbers which cannot maintain orthogonality when an orthogonal code for a maximum data rate is used;
   a controller for determining whether the respective orthogonal code numbers stored in the storage medium are available at a given data rate, when at least one data user requests data transmission at the given data rate, and outputting the determined available orthogonal code numbers and control signals according to the determination result;
   a plurality of channel transmitters, provided in association with the orthogonal code numbers from the controller, for spreading data from the data user with an orthogonal code corresponding to the orthogonal code number from the controller; and
   a plurality of multipliers for multiplying outputs of the channel transmitters by control signals from the controller.

8. The channel spreading device as claimed in claim 7, wherein the storage medium stores orthogonal code numbers generated by sequentially adding multiples of an orthogonal code length used at the maximum data rate to the orthogonal code number used at the maximum data rate within a full length of the orthogonal code, and the orthogonal code number used at the maximum data rate.

9. The channel spreading device as claimed in claim 7, wherein the controller determines whether other data users can transmit data at a data rate based on a primary data user having a top priority out of the data users; determines, when other data users can transmit the data, orthogonal code numbers which are available at the data rate from said other data users; and
   outputs the control signals corresponding to the determined orthogonal code numbers.

10. The channel spreading device as claimed in claim 9, wherein the controller outputs the control signals according to the priority of other data users when at least two other data users request data transmission at a given data rate in a state where there exists the primary data user.

11. The channel spreading device as claimed in claim 7, wherein the channel transmitter spreads the data from a primary data user with an orthogonal code corresponding to the orthogonal code number for the maximum data rate out of the orthogonal codes from the controller.

12. A channel spreading device for a CDMA communication system, comprising:
   a Walsh pool generator for generating only orthogonal code numbers which cannot maintain orthogonality when an orthogonal code for a maximum data rate is used;
   a memory for storing the orthogonal code numbers generated from the Walsh pool generator and an orthogonal code number used at the maximum data rate;
   a controller for determining whether the respective orthogonal code numbers stored in the memory are available at a given data rate, when at least one data user requests data transmission at the given data rate, and outputting the determined available orthogonal code numbers and control signals according to the determination result;
a plurality of channel transmitters for generating an orthogonal code corresponding to the orthogonal code number from the controller and spreading data from the data user with the generated orthogonal code; and
a plurality of multipliers for multiplying outputs of the channel transmitters by control signals from the controller.

13. The channel spreading device as claimed in claim 12, wherein the Walsh pool generator sequentially adds multiples of an orthogonal code length used at the maximum data rate to the orthogonal code number used at the maximum data rate within a full length of the orthogonal code, so as to generate orthogonal code numbers.

14. The channel spreading device as claimed in claim 12, wherein the controller determines whether other data users can transmit data at a data rate based on a primary data user having a top priority out of the data users; determines, when other data users can transmit the data, orthogonal code numbers which are available at the data rate from said other data users; and outputs the control signals corresponding to the determined orthogonal code numbers.

15. The channel spreading device as claimed in claim 14, wherein the controller outputs the control signals according to the priority of other data users when at least two other data users request data transmission at a given data rate in a state where there exists the primary data user.

16. The channel spreading device as claimed in claim 14, wherein the channel transmitter spreads the data from the primary data user with an orthogonal code corresponding to the orthogonal code number for the maximum data rate out of the orthogonal codes from the controller.

17. A channel spreading method for a CDMA communication system, comprising the steps of:
storing only orthogonal code numbers which cannot maintain an orthogonality due to an orthogonal code which a circuit data user uses at a maximum data rate;
determining whether the stored orthogonal code numbers are available at a given data rate, when at least one data user requests data transmission at the given data rate, and outputting the determined available orthogonal code numbers and control signals according to the determination result;
generating an orthogonal code corresponding to the output orthogonal code number and spreading data from the data user with the generated orthogonal code; and
multiplying outputs of the channel transmitters by the control signals.

18. The channel spreading method as claimed in claim 17, wherein said stored orthogonal code numbers include orthogonal code numbers generated by sequentially adding multiples of an orthogonal code length used at the maximum data rate to the orthogonal code number used at the maximum data rate within a full length of the orthogonal code, and the orthogonal code number used at the maximum data rate.

19. The channel spreading method as claimed in claim 17, wherein the control signals are generated by determining whether other data users can transmit data at a data rate based on a primary data user having a top priority out of the data users; determining, when other data users can transmit the data, orthogonal code numbers which are available at the data rate from said other data users; and outputting the control signals corresponding to the determined orthogonal code numbers.

20. The channel spreading method as claimed in claim 19, wherein the available orthogonal code numbers are allocated according to the priority of other data users when at least two other data users request data transmission at a given data rate in a state where there exists the primary data user.

21. A channel spreading method for a CDMA communication system, comprising the steps of:
determining orthogonal code numbers which are unavailable at a data rate lower than a maximum data rate, according to an orthogonal code length and an orthogonal code number for the maximum data rate;
generating only orthogonal code numbers which cannot maintain orthogonality when the orthogonal code for the maximum data rate is used;
storing the generated orthogonal code numbers and the orthogonal code number used at the maximum data rate;
primarily allocating the orthogonal code corresponding to the orthogonal code number for the maximum data rate to a supplemental channel for transmitting circuit data, when a circuit data user and a packet data user request transmission of circuit data and packet data at a given data rate; and
determining an orthogonal code number which is available at the data rate for the packet data, out of the orthogonal code numbers, and allocating the orthogonal code corresponding to the determined orthogonal code number to the supplemental channel for transmitting the packet data.

22. The channel spreading method as claimed in claim 21, wherein the orthogonal codes are generated by sequentially adding multiples of an orthogonal code length used at the maximum data rate to the orthogonal code number used at the maximum data rate within a full length of the orthogonal code.

23. The channel spreading method as claimed in claim 21, further comprising the step of determining whether it is possible to transmit the packet data at a data rate requested by the circuit data user, and determining, when the packet data can be transmitted, an orthogonal code number which is available at the data rate requested by the packet data user.

24. The channel spreading method as claimed in claim 23, wherein the available orthogonal codes are allocated according to a priority of the packet data users when at least two packet data users request transmission of packet data at a given data rate.

25. A channel spreading method for a CDMA communication system, comprising the steps of:
receiving an orthogonal code number which a circuit data user uses at a maximum data rate, and an orthogonal code length for the maximum data rate;
generating only orthogonal code numbers which cannot maintain orthogonality due to an orthogonal code used at the maximum data rate, by sequentially adding multiples of the received orthogonal code length to the received orthogonal number; and
storing the received orthogonal code number and the generated orthogonal code numbers in a Walsh pool.

26. The channel spreading method as claimed in claim 25, wherein the Walsh pool stores only the orthogonal code numbers within a full length of the orthogonal code.

27. A channel spreading method for a CDMA communication system, comprising the steps of:

storing in a memory only orthogonal code numbers which cannot maintain orthogonality with an orthogonal code used for a circuit data user;

primarily allocating an orthogonal code corresponding to an orthogonal code number for a maximum data rate and allocating the read orthogonal code to a supplemental channel for transmitting circuit data, when a circuit data user and a packet data user request transmission of circuit data and packet data; and determining an orthogonal code number which is available at a data rate of the packet data out of the orthogonal code numbers stored in the memory, and reading the determined orthogonal code to allocate the read orthogonal code to the supplemental channel for transmitting the packet data.

28. The channel spreading method as claimed in claim 27, further comprising the step of determining whether it is possible to transmit the packet data, according to the data rate for the circuit data, and determining, when the packet data can be transmitted, an orthogonal code number which is available at the data rate for the packet data.

29. The channel spreading method as claimed in claim 28, wherein the available orthogonal codes are allocated according to the priority of the packet data users when at least two packet data users request transmission of packet data at a given data rate.

* * * * *